(12) United States Patent
Zhou et al.

(10) Patent No.: US 9,317,883 B2
(45) Date of Patent: Apr. 19, 2016

(54) METHOD AND SYSTEM FOR VENTURE CAPITAL RAISING FOR STARTUP VIA AWARD AND REALITY TV SHOW

(71) Applicants: Tiger T G Zhou, Tiburon, CA (US); Dylan T X Zhou, San Gabriel, CA (US); Andrew H B Zhou, Tiburon, CA (US)

(72) Inventors: Tiger T G Zhou, Tiburon, CA (US); Dylan T X Zhou, San Gabriel, CA (US); Andrew H B Zhou, Tiburon, CA (US)

( * ) Notice: Subject to any disclaimer, the term of this patent is extended or adjusted under 35 U.S.C. 154(b) by 0 days.

(21) Appl. No.: 14/627,315

(22) Filed: Feb. 20, 2015

(65) Prior Publication Data
US 2015/0161721 A1 Jun. 11, 2015

Related U.S. Application Data

(63) Continuation-in-part of application No. 13/475,952, filed on May 19, 2012, now Pat. No. 9,009,166, and a continuation-in-part of application No. 14/555,628, filed on Nov. 27, 2014, now Pat. No. 8,985,442, and a (Continued)

(51) Int. Cl.
*G06F 17/30* (2006.01)
*G06Q 40/00* (2012.01)
*G06Q 30/02* (2012.01)
*G06Q 30/00* (2012.01)

(52) U.S. Cl.
CPC .......... *G06Q 40/00* (2013.01); *G06F 17/30864* (2013.01); *G06Q 30/00* (2013.01); *G06Q 30/0241* (2013.01)

(58) Field of Classification Search
CPC .......... G06F 17/30386; G06F 17/3058; H04L 65/60; H04L 65/02
USPC ........ 707/748, 758; 709/217, 219; 725/9, 14, 725/93; 705/329, 7.25, 7.23
See application file for complete search history.

(56) References Cited

U.S. PATENT DOCUMENTS

| | | | |
|---|---|---|---|
| 8,968,103 B2 * | 3/2015 | Zhou et al. ...................... | 463/42 |
| 9,009,166 B2 * | 4/2015 | Zhou et al. .................... | 707/748 |
| 2001/0032157 A1 * | 10/2001 | Dannenberg et al. ........... | 705/36 |
| 2002/0116215 A1 * | 8/2002 | Lawrence et al. ................. | 705/1 |
| 2006/0167765 A1 * | 7/2006 | Lacey et al. ..................... | 705/26 |
| 2007/0220575 A1 * | 9/2007 | Cooper et al. ................ | 725/118 |

OTHER PUBLICATIONS

Gompers et al., What Drives Venture Capital Fundraising?, Brookings Papers: Microeconomics, 1998, 149-204.*

(Continued)

*Primary Examiner* — Jean B Fleurantin
(74) *Attorney, Agent, or Firm* — Georgiy L. Khayet

(57) ABSTRACT

Provided are computer implemented methods and systems for venture capital raising for startup via award and reality TV show. An exemplary method comprises receiving information associated with startup projects. The information is provided to audience for online fund raising via an online resource. The information includes a target amount for online fund raising. One or more contributions associated with the startup projects are received from the audience. Based on the contributions, eligible startup projects are determined. The eligible startup projects are advertised on a television show on a country level. Assessment of the eligible startup projects is received from venture capitalists and private investors. Based on the assessment, country winning startup projects are selected. The country winning startup projects are advertised and assessed on an international television show on an international level. Based on international assessment, a world winning startup project is selected and awarded a prize amount.

28 Claims, 7 Drawing Sheets

Related U.S. Application Data continuation-in-part of application No. 13/185,491, filed on Jul. 18, 2011, and a continuation-in-part of application No. 13/287,279, filed on Nov. 2, 2011, now abandoned, and a continuation-in-part of application No. 13/620,775, filed on Sep. 15, 2012, now abandoned, and a continuation-in-part of application No. 13/875,311, filed on May 2, 2013, now abandoned, and a continuation-in-part of application No. 14/272,939, filed on May 8, 2014, now Pat. No. 8,851,372, and a continuation-in-part of application No. 14/198,683, filed on Mar. 6, 2014, now Pat. No. 8,968,103, and a continuation-in-part of application No. 14/260,650, filed on Apr. 24, 2014, and a continuation-in-part of application No. 13/172,892, filed on Jun. 30, 2011, now abandoned, and a continuation-in-part of application No. 13/471,773, filed on May 15, 2012, and a continuation-in-part of application No. 14/070,504, filed on Nov. 2, 2013, and a continuation-in-part of application No. 13/868,405, filed on Apr. 23, 2013.

(56) References Cited

OTHER PUBLICATIONS

Martin Hermsen, Multimedia-IT-Tools for Global Cooperation in Engineering Networks, 1998, IEEE, 2094-2098.*

* cited by examiner

METHOD AND SYSTEM FOR VENTURE CAPITAL RAISING FOR STARTUP VIA AWARD AND REALITY TV SHOW

CROSS-REFERENCE TO RELATED APPLICATIONS

This application is a continuation-in-part of U.S. patent application Ser. No. 13/287,279, entitled "METHODS AND SYSTEMS TO ADVERTISE AND SELL PRODUCTS OR SERVICES VIA CLOUD GAMING ENVIRONMENTS," filed on Nov. 2, 2011, U.S. patent application Ser. No. 13/868,405, entitled "SYSTEM AND METHOD FOR ADVERTISING AND SELLING OF A VENTURE PROJECT VIA COMPETITIVE CAPITAL RAISING," filed on Apr. 23, 2013, U.S. patent application Ser. No. 13/875,311, entitled "FACILITATING MOBILE DEVICE PAYMENTS USING MOBILE PAYMENT ACCOUNT, MOBILE BARCODE AND UNIVERSAL DIGITAL MOBILE CURRENCY," filed on May 2, 2013, U.S. patent application Ser. No. 13/620,775, entitled "METHODS AND SYSTEMS FOR FACILITATING MOBILE DEVICE PAYMENTS USING CODES AND CASHBACK BUSINESS MODEL," filed on Sep. 15, 2012, U.S. patent application Ser. No. 13/185,491, entitled "FACILITATING MOBILE DEVICE PAYMENTS USING PRODUCT CODE SCANNING," filed on Jul. 18, 2011, U.S. patent application Ser. No. 13/471,773, entitled "RETAIL ENVIRONMENTS WITHIN SOCIAL NETWORKING ENGINES," filed on May 15, 2012, U.S. patent application Ser. No. 13/172,892, entitled "RETAIL ENVIRONMENTS WITHIN SOCIAL NETWORKING ENGINES," filed on Jun. 30, 2011, U.S. patent application Ser. No. 14/070,504, "METHOD AND SYSTEM FOR SELLING PRODUCTS AND SERVICES VIA CROWDSOURCING," filed on Nov. 2, 2013, U.S. patent application Ser. No. 13/475,952, "METHOD AND SYSTEM FOR SOCIAL CREDIT SCORING," filed on May 19, 2012, U.S. Pat. No. 8,851,372, "WEARABLE PERSONAL DIGITAL DEVICE WITH CHANGEABLE BENDABLE BATTERY AND EXPANDABLE DISPLAY USED AS STANDALONE ELECTRONIC PAYMENT CARD," filed on May 8, 2014, U.S. patent application Ser. No. 14/555,628, "ONE-TOUCH PAYMENT USING HAPTIC CONTROL VIA A MESSAGING AND CALLING MULTIMEDIA SYSTEM ON MOBILE DEVICE AND WEARABLE DEVICE, CURRENCY TOKEN INTERFACE, POINT OF SALE DEVICE, AND ELECTRONIC PAYMENT CARD," filed on Nov. 27, 2014, U.S. patent application Ser. No. 14/198,683, "SYSTEMS AND METHODS FOR DIGITAL MULTIMEDIA CAPTURE USING HAPTIC CONTROL, CLOUD VOICE CHANGER, AND PROTECTING DIGITAL MULTIMEDIA PRIVACY," filed on Mar. 6, 2014, U.S. patent application Ser. No. 14/260,650, "METHOD AND SYSTEM FOR SELLING PRODUCTS AND SERVICES VIA CROWDSOURCING AND REALITY TV SHOW," filed on Apr. 24, 2014, which are incorporated herein by reference in their entirety.

FIELD

This application relates generally to data processing, and more specifically to methods and systems for venture capital raising for startup via award and reality TV show.

BACKGROUND

Crowdsourcing is related to obtaining services, products, or ideas, by soliciting contributions from a large group of people. The crowdsourcing schemes may be employed for product development at all steps of product development lifecycle, from fund raising to sale of finished products or services by groups of people. Wider audience can be attracted by broadcasting stages of product, startup or service development in television and introducing a competition component.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are computer implemented methods and systems for venture capital raising for startup via award and reality television show. Using the methods or systems described herein an individual or organization may offer a startup project for venture capital raising. For this purpose, a startup creator may provide information on a crowdsourcing item to a crowdsourcing system. The system for venture capital raising for startup via award and reality television show may receive information associated with startup projects from various startup creators in different countries. The information includes a target amount for online fund raising, startup description, business plan, a country associated with the startup project, and so forth. The system may pre-select a predefined number of startup projects based on predefined criteria using the received information. The predefined criteria may include a maximum allowed target amount for the online fund raising, minimum age of the startup creator, an execution period for the startup project, and so forth.

The predefined number of startup projects are provided for the online fund raising via an online resource. The startup projects may be provided in different groups for different countries. Contributions for the online fund raising for each of the predefined number of startup projects may be received from audience via the online resource. The audience may filter the projects based on the country associated with the project. The online fund raising may continue for a limited period or may terminate when a certain number of the startup projects receive the target amount through the contributions. The startup projects that receive the target amount within the limited period or being among the certain number of first projects reached the target amount may be considered eligible startup projects. The eligible startup projects may be determined as several groups for different countries.

The eligible startup projects may be advertised on a television show on a country level. Similar television shows may be performed in a plurality of countries. For advertising, the startup creator may provide advertising materials. Alternatively, the advertising materials may be prepared by a team associated with the system for venture capital raising for startup via award and reality television show. Progress of the eligible startup projects may be assessed by a group of venture capitalists and private investors. Based on the assessment, country winning startup projects may be selected for each of the countries associated with the television show. The country winning startup projects may be advertised on an international television show and assessed by an international group of venture capitalists and private investors. Based on the international assessment, a world winning startup project may be selected among the country winning startup projects.

The world winning startup project may be awarded a prize amount associated with the system for the online fund raising via an online resource.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF DRAWINGS

Embodiments are illustrated by way of example and not limitation in the figures of the accompanying drawings, in which like references indicate similar elements and in which.

DETAILED DESCRIPTION

Various computer implemented methods and systems for venture capital raising for startup via award and reality television show are described herein. Entertainment has spread across multiple areas of life. One of the trends is reality television (TV) shows and competitions featuring real people instead of actors. Through wide audience involvement, reality TV shows can attract popularity and financing to ideas, new talents, problems, and so forth. The described system introduces a new level of competition into reality shows. The competition begins on a country level in a plurality of countries. Through several stages of competition within a country, a country winner is determined. The competition then proceeds with an international stage, where country winners compete with each other.

Figure 1:
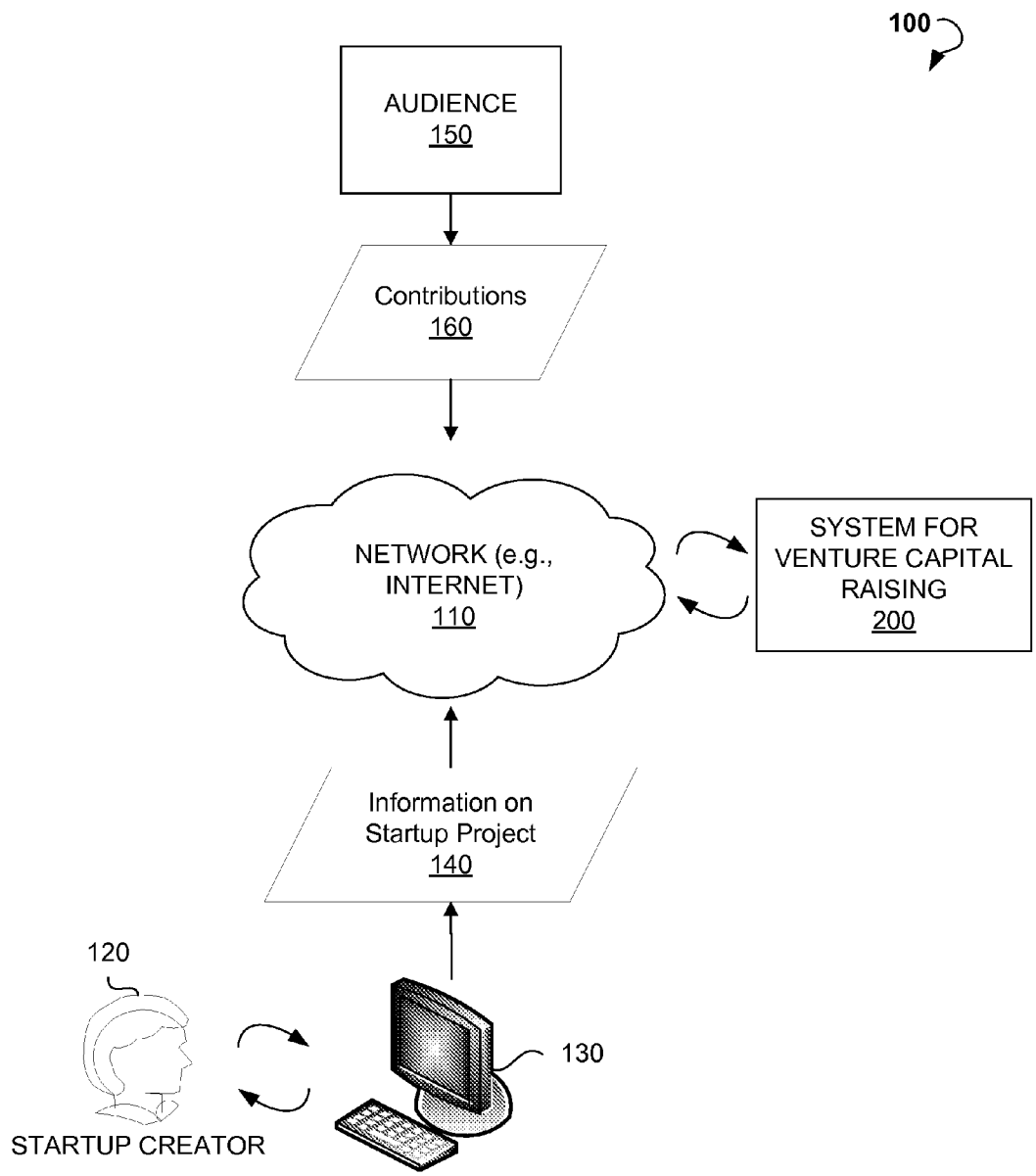
FIG. 1 is a block diagram showing an environment within which a method and system for venture capital raising for startup via award and reality television show can be implemented, in accordance with an example embodiment.

Referring now to the drawings, FIG. 1 illustrates an environment 100 within which methods and a system 200 for venture capital raising for startup via award and reality TV show can be implemented. The environment 100 may include a startup creator 120, a client device 130, network 110, the system 200 for venture capital raising, and audience 150.

The startup creator may include an individual, organization, or entity associated with a startup project. The startup creator may provide information on startup project 140 to the system 200. The information on startup project 140 may include textual, multimedia, or other information related to startup project which the startup creator 120 desires to promote using the system 200. Additionally, the information on startup project 140 may include publishing, editing, sharing, or reposting messages, texts, recommendations, ideas, creations, reviews, comments, articles, photo materials, video materials, games, drawings, links, answers, payments, buying and selling records, and other activity related to the startup creator. In some embodiments, the information on startup project 140 may specify a target amount for contributions 160 to be received from the audience 150. Furthermore, the information on startup project 140 may include startup description, business plan, a country associated with the startup project, and so forth.

The startup project may be associated with various types of business, products, services, and so forth. The startup creator 120 may communicate with the system 200 via the network 110 using the client device 130.

The network 110 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34b is analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a Universal Serial Bus (USB) connection or other wired or wireless, digital or analog interface or connection, mesh or Digi® networking. The network 110 may include any suitable number and type of devices (e.g., routers and switches) for forwarding commands, content, and/or web object requests from each client to the online community application and responses back to the clients. The device 200 may be compatible with one or more of the following network standards: GSM, CDMA, LTE, IMS, Universal Mobile Telecommunication System (UMTS), RFID, 4G, 5G, 6G and higher.

The client device 130, in some example embodiments, may include a Graphical User Interface (GUI) for displaying the user interface associated with the system 200. In a typical GUI, instead of offering only text menus or requiring typed commands, the system 200 may present graphical icons, visual indicators, or special graphical elements called widgets that may be utilized to allow the startup creator 120 to interact with the system 200 and/or the audience 150. The client device 130 may be configured to utilize icons used in conjunction with text, labels, or text navigation to fully represent the information and actions available to owner 120 and/or audience 150.

The client device 130 may include a mobile telephone, a computer, a lap top, a smart phone, a tablet PC, and so forth. The information on startup project 140 provided by the startup creator 120 via the client device 130 may be stored and, in certain embodiments, analyzed by the system 200 to check whether the startup project, for which information 140 is provided, complies with predefined criteria. The complying startup projects may be pre-selected and provided to the audience via an online resource. The online resource may be associated with the system 200 and may include a web portal, a web site, a web application, a cloud application, a social network page, and so forth.

The audience 150 may include any and all users of the network 110 as well as TV show viewers. One or more users of the audience 150 may provide the contributions 160 to the startup project. The contributions 160 may include monetary contributions, investments, content amendments, idea proposals, votes on a specific matter, and so forth.

The system 200 may process the received contributions 160 to calculate their number or amount. Thus, the system 200 may determine that the target amount associated with the startup project is reached. The startup projects that have reached the target amount may be considered eligible projects for participation in TV show associated with the system 200. The target amount of contributions of the eligible startup projects may be transferred to the startup creators. Contribution associated with the startup projects that have not reached the target amount during the allowed period, may be returned to the contributors.

Figure 2:
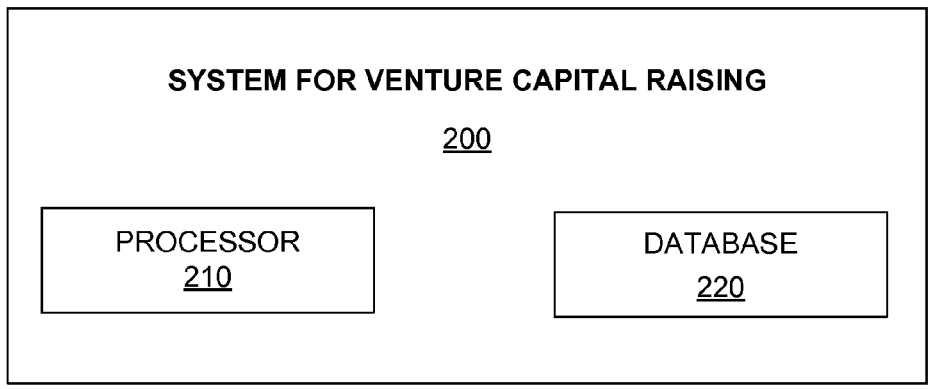
FIG. 2 is a block diagram showing various modules of the system for venture capital raising for startup via award and reality television show, in accordance with certain embodiments.

FIG. 2 is a block diagram showing various modules of the system 200 for venture capital raising, in accordance with certain embodiments. The system 200 may comprise a processor 210 and a database 220. The processor 210 may include a programmable processor, such as a microcontroller, central processing unit (CPU), and so forth. In other embodiments, the processor 210 may include an application-specific integrated circuit (ASIC) or programmable logic array (PLA), such as a field programmable gate array (FPGA), designed to implement the functions performed by the system 200. Thus, the processor 210 may receive information on startup projects from startup creators and pre-select a predetermined number of startup projects based on predefined criteria. Information on the predefined number of startup projects may be placed on an online resource for online fund raising via contributions from the audience. In some embodiments, the pre-selected startup projects may receive crowd funding and advice from mentors associated with the system 200.

Based on the contributions, the processor 210 may determine eligible startup projects for TV show for each of the countries associated with the system 200. Advertising materials associated with the eligible startup projects may be received by the processor 210 from the startup creator or a team associated with the system 200. The advertising materials may include one or more video recordings, one or more audio recording, photos, financial reports, and so forth. The video recordings including audition episodes performed by the group of venture capitalists and private investors Furthermore, the processor 210 may receive assessment of the eligible startup projects from a group of venture capitalists and private investors. The assessment may be processed by the processor 210 separately for each country. The assessment may include a plurality of marks from each of the group of venture capitalists and private investors. The marks may be awarded after various time periods, for example, each week, each month, each quarter, each year, and so forth. Additionally, the assessment may include investments and votes of the audience, the votes being provided via SMS, online resources, phone calls, mobile applications, social networks, and so forth. Based on the assessment, intermediate awards may be periodically provided. Furthermore, some of the eligible startup projects may be periodically eliminated from the TV show based on the assessment. For example, total amounts of marks associated with each of the eligible startup project may be periodically compared and the projects with the least total amounts of marks may be excluded from the TV show.

Finally, a country winning startup project may be determined for each country. Country winning startup projects may then be promoted to an international TV show for international competition. The international TV show may be broadcasted at least in the countries associated with the system 200.

The international TV show may repeat the procedure of the country-level show with an international group of investors. As a result of the international TV show, the processor 210 may determine a world winning startup project and award a prize amount to the world winning startup project.

The information associated with the startup projects may be stored in the database 220 and may be accessible for members of the audience via a web-site, application, or newsletters associated with the system 200. The database 220 may be further configured to store the information related to startup creators, contributions, and so forth.

Figure 3:
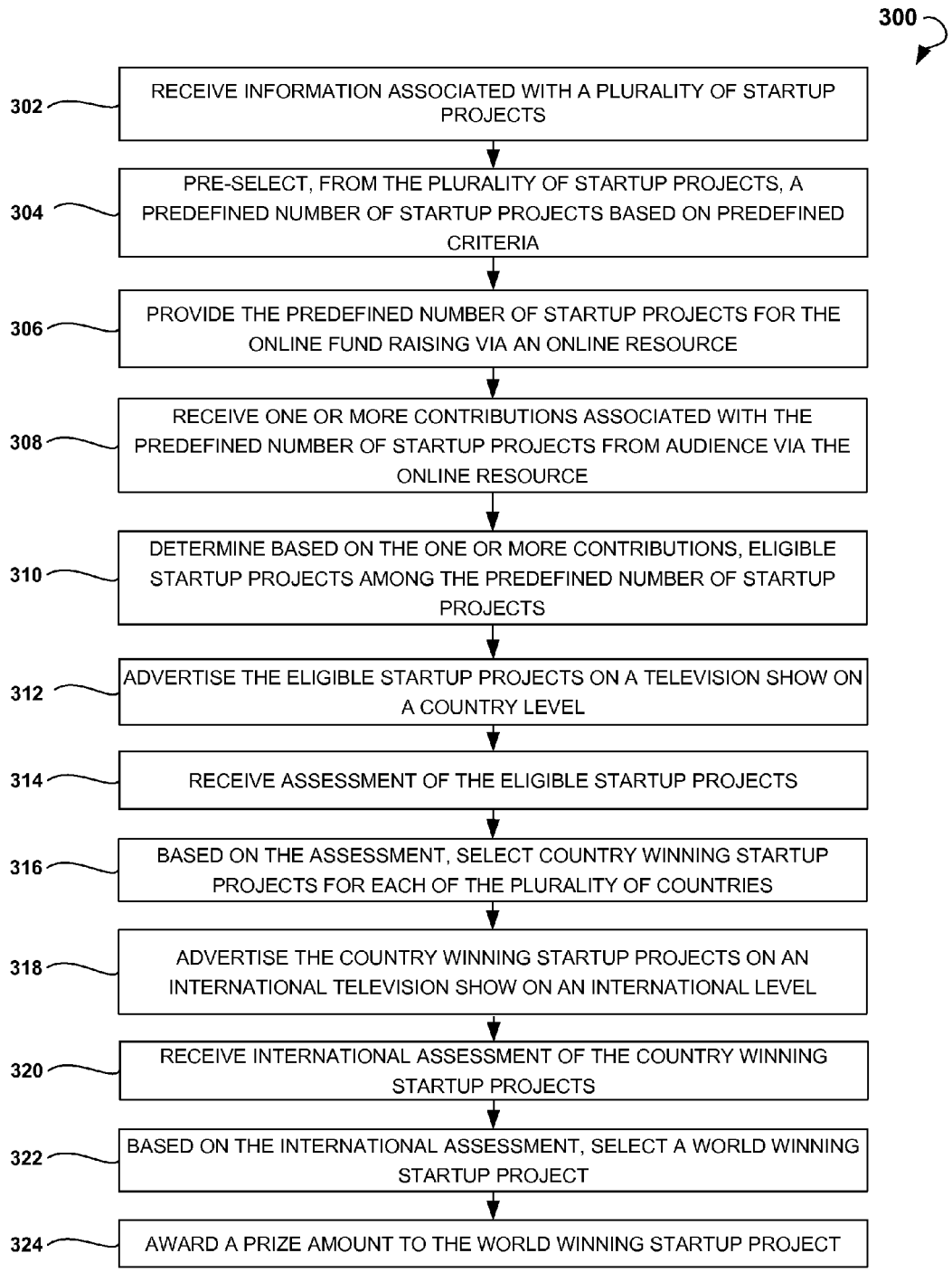
FIG. 3 is a flow chart illustrating a method for venture capital raising for startup via award and reality television show, in accordance with certain embodiments.

FIG. 3 is a flow chart illustrating a method 300 for venture capital raising for startup via award and reality TV show, in accordance with some example embodiments. The method 300 may be performed by logic that may comprise hardware (e.g., dedicated logic, programmable logic, and microcode), software (such as software run on a general-purpose computer system or a dedicated machine), or a combination of both. In one example embodiment, the processing logic resides at the system 200 for venture capital raising, and the various elements of the system 200 can perform the method 300. It will be appreciated by one of ordinary skill that examples of the foregoing modules may be virtual, and instructions said to be executed by a module may, in fact, be retrieved and executed by software. Although various elements may be configured to perform some or all of the various operations described herein, fewer or more elements may be provided and still fall within the scope of various embodiments.

As shown in FIG. 3, the method 300 may commence at operation 302 with receiving information associated with a plurality of startup projects. The startup project may include a product, a service, and a business and may be associated with a startup creator. The information may be received through a user interface of the system 200 via network or otherwise.

At operation 304, the system 200 may pre-select a predefined number of startup projects based on predefined criteria, such as, for example, a maximum allowed target amount for the online fund raising, minimum age of the startup creator, an execution period for the startup project, country, and so forth.

At operation 306, the pre-selected startup projects are provided for the online fund raising via an online resource. The information associated with the pre-selected startup projects may be provided on the online resource available for audience. Additionally, the startup creators may provide further information on the project development via the online resource. The audience may review the information and make contributions (for example, money transfer) for a specific startup project. In some embodiments, the system 200 may assign mentors to the pre-selected startup projects. The mentors may advise the startup creators on project development, promotion, presentation, and so forth.

At operation 308, the contributions may be received from the audience via the online resource. The aim of fund raising via the online resource is to identify the projects attractive for the audience and to collect an initial amount for their development. When a set number of startup projects reach the target amount, these projects may be determined as eligible at operation 310. Each of the eligible startup projects receive a total amount of contributions received in connection with that project.

Furthermore, the startup creators associated with the eligible startup projects provide advertising materials related to their projects. The advertising materials may include video, audio, photo and/or graphical information reflecting project progress and reporting the use of the contributions. The advertising materials may be prepared by the startup creator and/or a team associated with the system 200. At operation 312, the eligible startup projects may be advertised on a TV show on a country level. The advertising includes broadcasting of at least the advertising materials on television, radio, online resources, and so forth. Similar TV shows may be broadcasted in different countries with different projects associated with that country. In each country, the eligible projects may be assessed by a group of venture capitalists and private investors at operation 314. Additionally, the assessment may include votes of the audience, the votes being provided via SMS, online resources, phone calls, mobile applications, social networks, and so forth. The assessment may be performed periodically (e.g., weekly, monthly, quarterly, and so forth). Based on the assessment, intermediate awards may be provided to certain startup projects. For example, intermediate awards may include a people's choice award, the venture capitalists and private investors' award, best mark award, and so forth. Periodically, some of the startup projects may be eliminated from the TV show based on the assessment.

In some embodiments, a startup project that is eliminated is sold to public, the sale including a direct sale, a sale via an auction, a delayed sale, and a sale with payment by installments. The sale may be performed using a mobile and wearable device, which is located on a human body (e.g. a wrist, an arm, a neck, a head, a leg, a waist, an ear, a finger, and any other part of the human body). The mobile and wearable device may be associated with one or more of a transactional payment based on Unstructured Supplementary Service Data (USSD), Short Message Service (SMS), direct operator billing, a credit card mobile payment, an online wallet, a QR code payment, contactless near field communication payment, a cloud-based mobile payment, an audio signal-based payment, a Bluetooth Low Energy (BLE) signal beacon payment, an in-application payment, an SDK payment, an API payment, a social networking payment, and a direct carrier, bank co-operation, and so forth.

Access to the device may be controlled by one or more of the following: a password, a Personal Identification Number (PIN) code, and biometric authorization, the biometric authorization including fingerprint scanning, palm scanning, face scanning, and retina scanning. In some embodiment, the scanning is performed using the one or more biometric sensors (e.g., sensors for measuring a blood pressure, a pulse, a heart rate, a glucose level, a body temperature, an environment temperature, arterial properties). The measuring may be shown on the display. The device may also include a fingerprint reader configured to scan a fingerprint. The scanned fingerprint may be matched to one or more approved fingerprints. Access to the wearable personal digital is granted based on the matching.

At operation 316, country winning startup projects may be selected for each of the countries where the country-level TV shows are broadcasted. At operation 318, the country winning startup projects may be advertised on an international TV show on an international level. The country winning startup projects may receive international assessment at operation 320. Based on the international assessment, a world winning project may be determined at operation 322. For example, the project which has received a higher assessment than other country winning projects may be determined a world wining startup project. The world winning startup project may be awarded a prize amount at operation 324. The prize amount may be transferred to an account associated with the world winning startup project.

Figure 4:
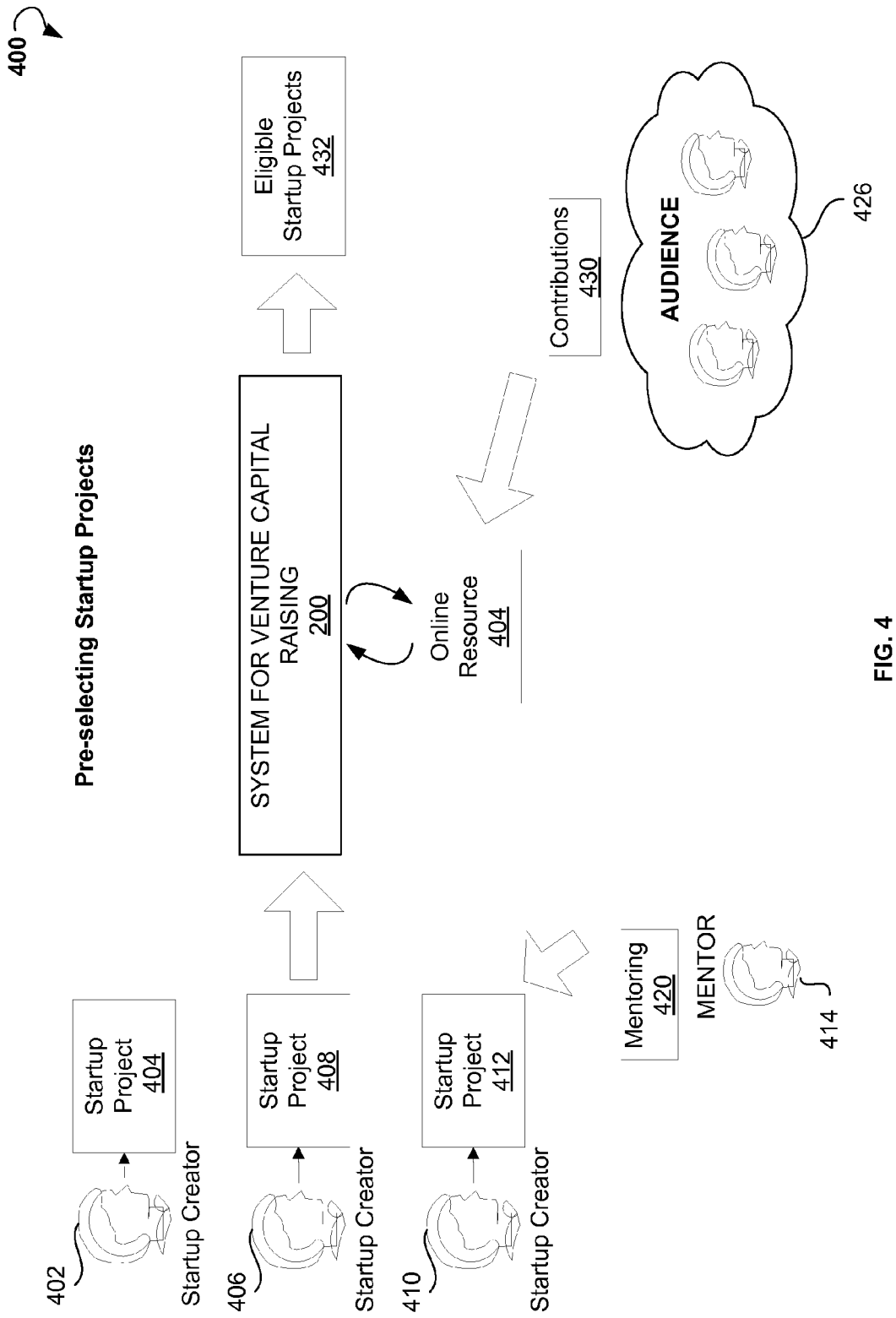
FIG. 4 is a block diagram illustrating an example representation of pre-selecting startup projects for the online fund raising via an online resource, in accordance with certain embodiments.

FIG. 4 is a block diagram illustrating an example representation of pre-selecting startup projects 400 for the online fund raising via an online resource, in accordance with certain embodiments. Startup creators 402, 406, 410 may provide information on startup projects 404, 408, 412 to the system 200 for venture capital raising. Information may include a total amount required for the project. For example, the target amount may include an amount for startup development. The startup projects 404, 408, 412 may be pre-selected by the system 200 based on predefined criteria and provided to audience 426 via an online resource 404. The pre-selected projects may receive mentoring 420 from a mentor 414.

The audience 426 may transfer contributions 430 to certain of the startup projects 404, 408, 412 via the online resource 404. The system may calculate the amount of contributions 430 and determine the projects that have reached a target amount of online fund raising. When a certain number of the startup projects 404, 408, 412 reach the target amount, these projects may be determined eligible startup projects 432. The eligible startup projects 432 may be forwarded to a country-level competition.

Figure 5:
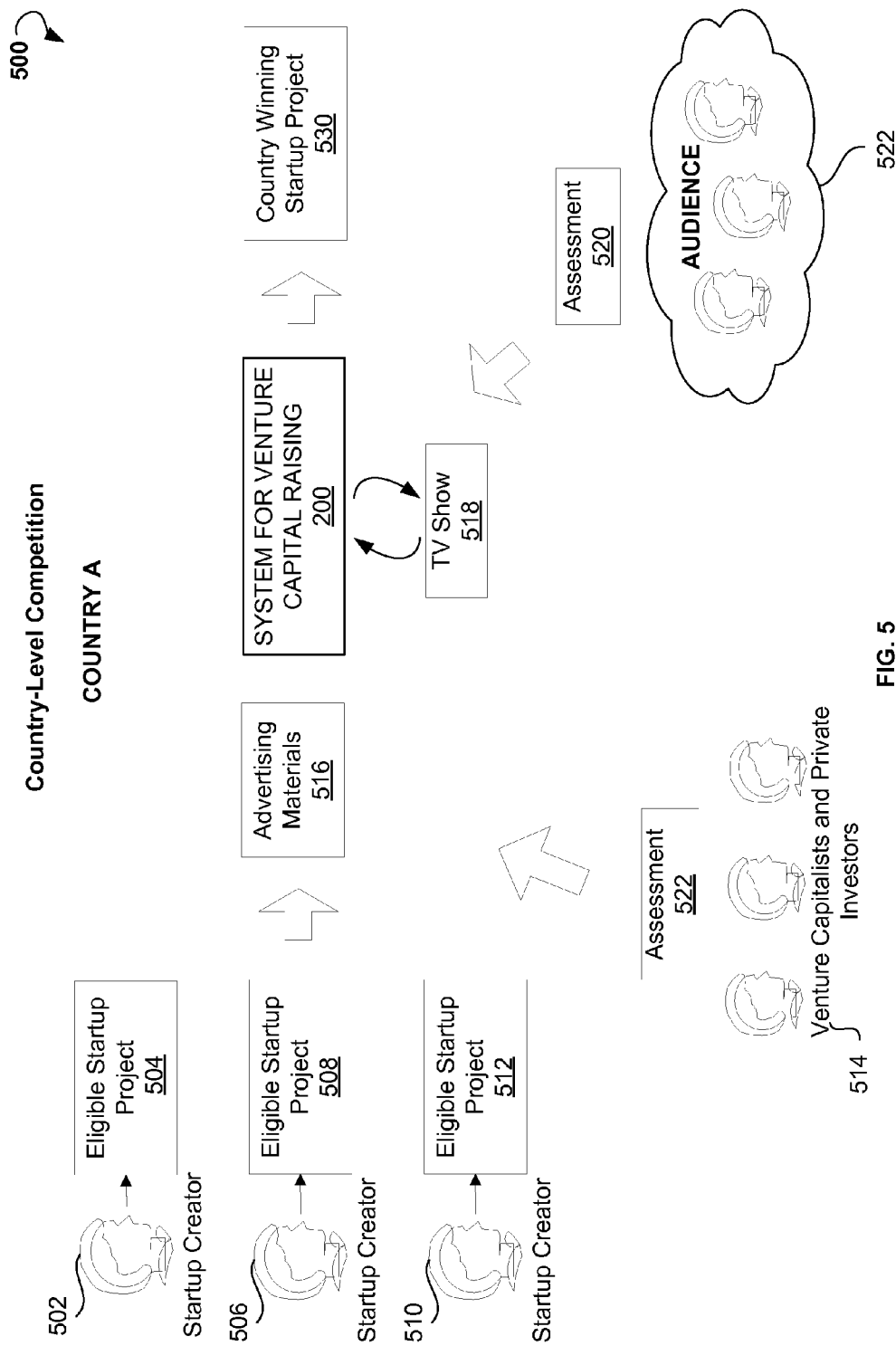
FIG. 5 is a block diagram illustrating an example representation of country-level competition, in accordance with certain embodiments.

FIG. 5 is a block diagram illustrating an example representation of country-level competition 500, in accordance with certain embodiments. The eligible startup projects 504, 508, 512 associated with country A may be promoted via TV show 518. The TV show 518 may be an interactive, competitive fundraising program where startup creators 502, 506, 510 present their startup projects 504, 508, 512 and describe the progress they reached with the received contributions amount. Each of the startup creators 502, 506, 510 may provide advertising materials 516 related to one of the startup projects 504, 508, 512 associated with him. The advertising materials 516 associated with the startup ideas 504, 508, 512 may be provided to the audience 522 via television broadcasting, a public demonstration, a radio broadcasting, an online broadcasting, and so forth. For example, the startup projects 504, 508, 512 may be presented via social networks (e.g. Facebook, Google+, and so forth), demonstrations of the startup projects 504, 508, 512 may be posted on YouTube, product descriptions may be posted in online shops (e.g. Amazon, Ebay, Walmart, and so forth).

Venture capitalists and private investors 514 may take part in the TV show 518. They communicate with the startup creators 502, 506, 510, review the advertising materials 516 and give assessment 522 of the eligible startup projects 504, 508, 512 and their success. The advertising materials 516 may include a startup creator presentation associated with a startup project. The startup creator presentation may be performed weekly or monthly. The venture capitalists and private investors 514 and/or a panel of judges may criticize the startup projects 504, 508, 512 and their presentations made by the startup creators 502, 508, 510. Additionally, the venture capitalists and private investors 514 may provide a pre-investment amount to one or more of the startup projects 504, 508, 512 at own discretion.

In some embodiments, an initial stage of the TV show may include "blind auditions," where the venture capitalists and private investors 514 may face away from the startup creators 502, 508, 510 making the presentation and towards the audience during the startups creator performances and demos. One of the venture capitalists and private investors 514 who is interested in the presentation presses his button, which turns their chair toward the startups owner and illuminates the bottom of the chair to read "I invest in you" and at the same time the investment amount and team name of the startup shows on the display of the back of the chair that is turned towards the audience which the startups owner cannot see. That means that the interested venture capitalist accepts the startup project for mentoring. Several venture capitalists may accept the same startup project for mentoring, then the startup creator chooses one of them. The system 200 receive results of the blind auditions and a choice of startup creators who received acceptance from several venture capitalists. The accepted startup projects pass to semifinal competition. In some embodiments, the blind audition may take place in different cities of the countries associated with the system.

From the semifinal onwards the contestants perform their demonstrations live. Judges may criticize each performance. The contestants may be voted for by the audience, and the outcome of the public votes is then revealed in the results show typically on the following night. The results shows feature group performances by the contestants as well as guest performers. At a finale show, the winner of the TV show may be determined. In the final live performance phase of the competition, startup creators may perform in weekly shows, where investments and contributions narrow to a final group of startups. The world winning project may be selected among the final group.

During further rounds of the TV show, the mentor advise the startup creator on application of the investments. Invited celebrity guests may assist the mentor in this task. Different celebrity guests may participate in different rounds of the TV show.

At the conclusion of the demonstration of presentations, a startups creator either defaults to the only investor who turned around, or selects an investor if more than one investor expressed his interest in the idea. The venture capitalists and private investors 514 may guide the startup creators 502, 508, 510 through the show process, mentor, give advice and support.

Additionally, audience 522 may contribute to the assessment 520 through contributions. The assessment 520 from the audience 522 includes SMS votes, phone calls, online votes, and so forth. Based on the assessment 520, 522, some of the startup projects 504, 508, 512 may be considered failed and drop out of the TV show. The rest of the startup projects 504, 508, 512 may continue competition. Finally, after several round of presenting the advertising materials 516 and assessment 520, 522, one of the eligible startup projects 504, 508, 512, the assessment of which is higher than the assessment of the other projects, may be determined a country winning startup project 530.

In some embodiments, venture capitalists and private investors may receive a performance fee or a carried interest from the startup projects that they mentor. The carried interest is a share of the profits of an investment that is paid to the investor as the investment manager in excess of the amount that the manager contributes to the partnership. As a practical matter, it is a form of performance fee that rewards the venture capitalists and private investors as manager for enhancing performance. Furthermore, one or more of the group of venture capitalists and private investors may invest their own money in one or more of the eligible startup projects and receive return on the investment.

Figure 6:
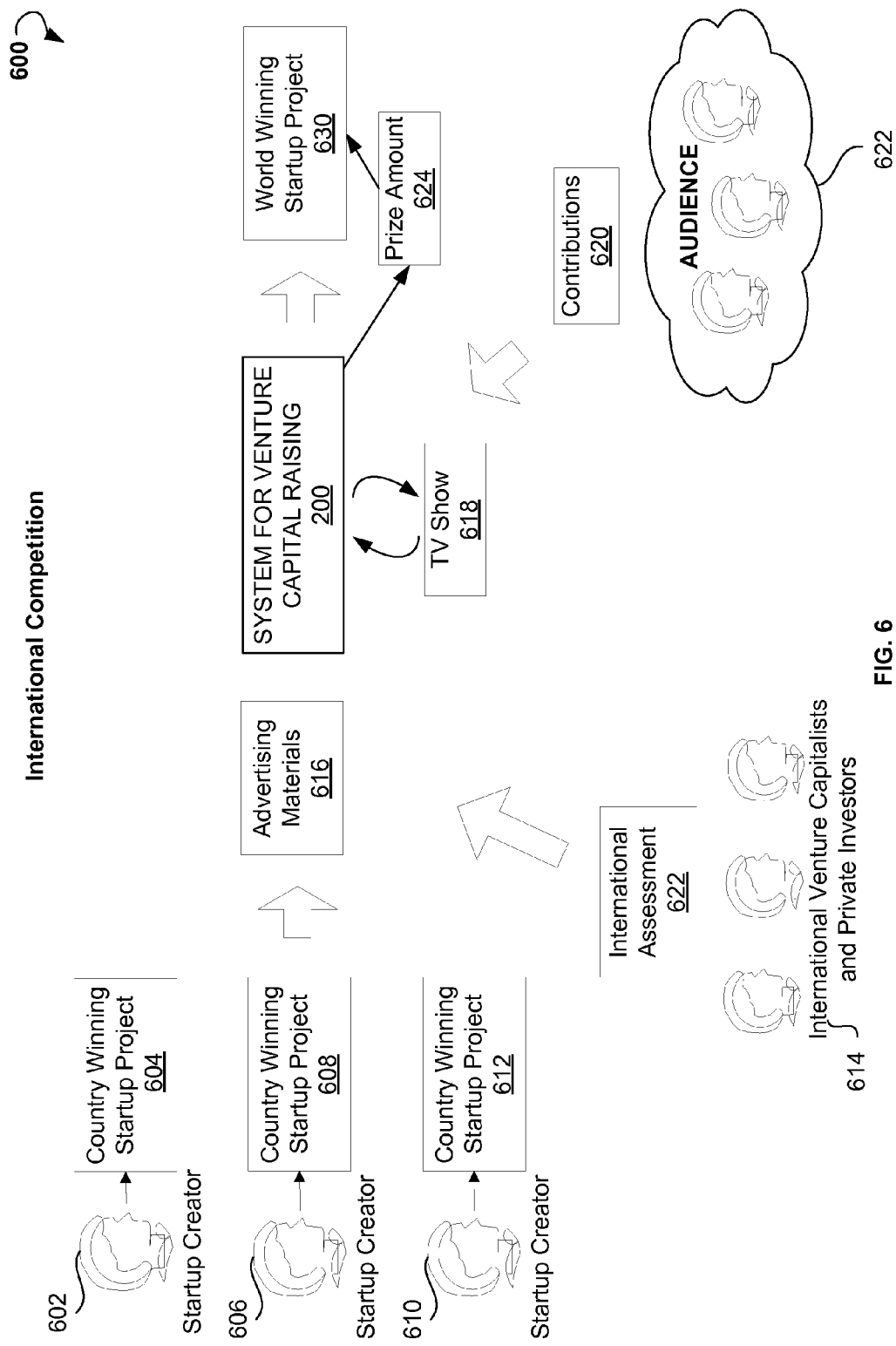
FIG. 6 is a block diagram illustrating an example representation of international competition, in accordance with certain embodiments.

FIG. 6 is a block diagram illustrating an example representation of international competition 600, in accordance with certain embodiments. Country winning startup projects 604, 608, 612 presented by their creators 602, 606, 610 may compete on an international level. Each of the country winning startup projects 604, 608, 612 may be associated with a specific country. For example, project 604 may be associated with country A, project 608—country B, and so forth. Advertising materials 616 associated with the country winning startup projects 604, 608, 612 may be presented and assessed in a way similar to a country-level competition with an international venture capitalists and private investors 614 providing an international assessment.

At some stages of the TV show 618, the fate of the startup projects 604, 608, 612 may be decided by public vote, the amount of investment received, and/or the quantity of products sold. As a part of international assessment 622, the audience 622 may make contributions 620 to the startup projects 604, 608, 612 of their choice. Contributions 620 may be received via one or more of the following: an SMS service, an online transaction, a phone service, a social network, a banking operation, a barcode scanning from a mobile device of a person, and so forth. An amount of the contributions 620 associated with each startup project 604, 608, 612 may be evaluated. The contribution amounts may be compared to determine the startup projects 604, 608, 612 that attract the least amount of contributions 620. Such startup projects may be considered failed and drop out of the international TV show. The drop out procedure may periodically repeat and, finally, a world winning startup project 630 which received the highest international assessment 622 and the biggest amount of the contributions 620 may be determined. This process may be limited in time, thus determining a world winning startup project 630 may be based on a month, season or year round time. The world winning startup project 630 may be awarded a prize amount.

The startup projects 604, 608, 612 which received a lower assessment and/or a lower amount of the contributions 620 may be considered failed. In some embodiments, failed startup projects may be sold to public. The sale may include a direct sale, a sale via an auction, a delayed sale, a sale with payment by installments, and so forth.

In some embodiments, the TV show may generate income through sales of television advertisements, merchandise, concert tickets, additional sponsorship, and so forth. Sponsors may receive a variety of promotions of their products on the show such as product placement, adverts, product promotions integrated into the show, various promotional opportunities, and the like. For example, a logotype of one or more products associated with the sponsor may be displayed during the reality show on a table of the judges; the owners may be shown in premises including a logotype or one or more products associated with the sponsors.

In some embodiments, the winner and/or other startup creators may be required to pass a predefined amount or a percentage of the received prize amount to the system 200 for the promotion, publicity and advertisement.

In some embodiments, third party advertisements may be displayed at various steps of the reality show crowdsourcing.

Furthermore, startups products and services may be displayed in a theme park to have show ticketing fee.

Figure 7:
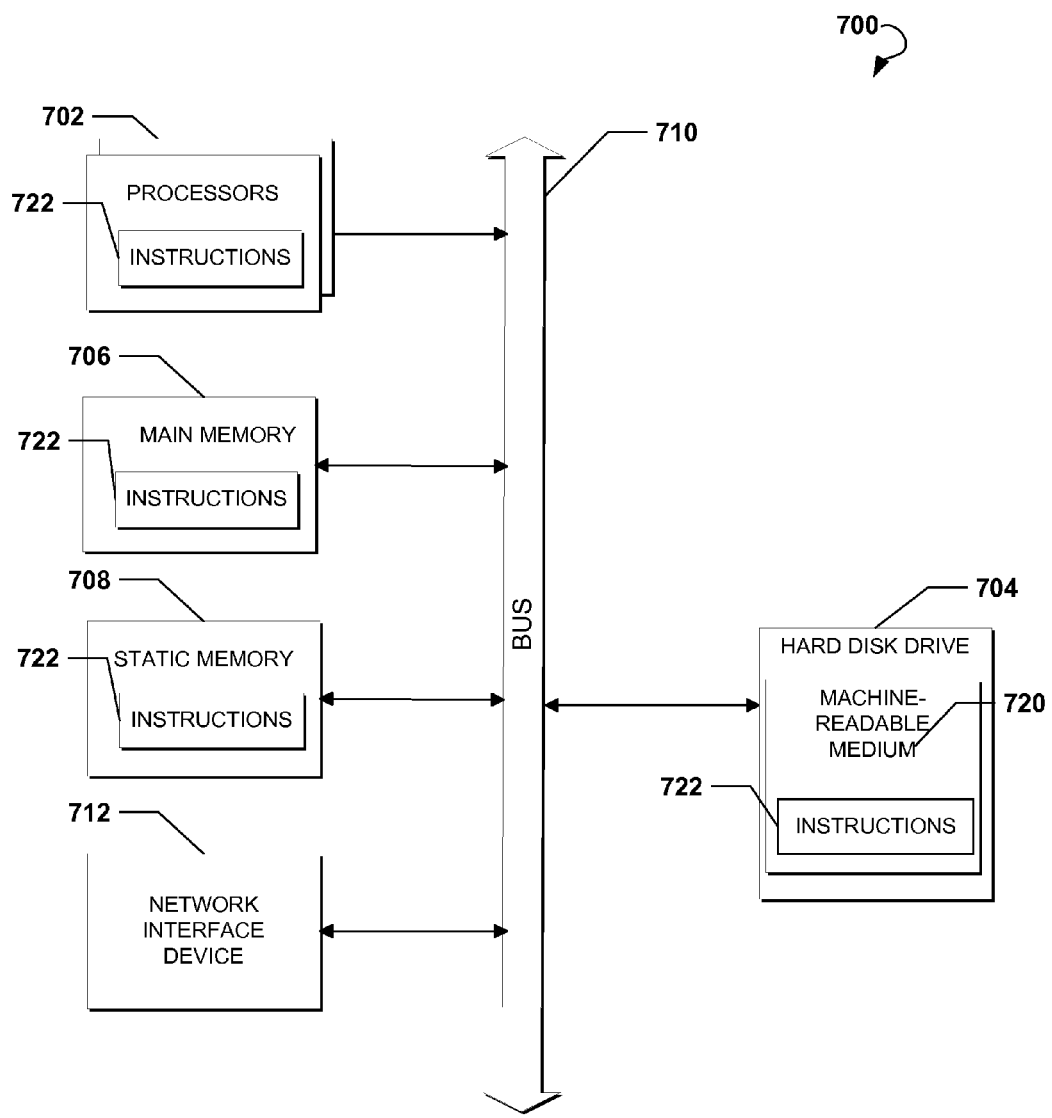
FIG. 7 shows a diagrammatic representation of a computing device for a machine in the exemplary electronic form of a computer system, within which a set of instructions for causing the machine to perform any one or more of the methodologies discussed herein, can be executed.

FIG. 7 shows a diagrammatic representation of a computing device for a machine in the exemplary electronic form of a computer system 700, within which a set of instructions for causing the machine to perform any one or more of the methodologies discussed herein can be executed. In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a cellular telephone, a digital camera, a portable music player (e.g., a portable hard drive audio device, such as an Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor or multiple processors 702, a hard disk drive 704, a main memory 706 and a static memory 708, which communicate with each other via a bus 710. The computer system 700 may also include a network interface device 712. The hard disk drive 704 may include a computer-readable medium 720, which stores one or more sets of instructions 722 embodying or utilized by any one or more of the methodologies or functions described herein. The instructions 722 can also reside, completely or at least partially, within the main memory 706 and/or within the processors 702 during execution thereof by the computer system 700. The main memory 706 and the processors 702 also constitute machine-readable media.

While the computer-readable medium 720 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, NAND or NOR flash memory, digital video disks, RAM, ROM, and the like.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, C, C++, C# or other compilers, assemblers, interpreters or other computer languages or platforms.

Thus, various systems and methods for venture capital raising for startup via award and reality TV show have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. A computer implemented method for venture capital raising for startup via award and reality television show, the computer implemented method comprising:

receiving, by a processor, information associated with a plurality of startup projects, wherein the information includes a target amount for online fund raising, each of the plurality of startup projects being associated with a startup creator;

pre-selecting, by the processor, from the plurality of startup projects, a predefined number of startup projects based on predefined criteria, the predefined criteria including one or more of the following: a maximum allowed target amount for the online fund raising, minimum age of the startup creator, an execution period for the startup project;

assigning, by the processor, mentors to the predefined number of startup projects, the mentors being selected from a group of venture capitalists and private investors;

providing, by the processor, the predefined number of startup projects for the online fund raising and for mentoring via an online resource;

receiving, by the processor, one or more contributions associated with the predefined number of startup projects from audience via the online resource;

receiving, by the processor, from the mentors, mentoring associated with development of the predefined number of startup projects;

determining, by the processor, based on the one or more contributions, eligible startup projects among the predefined number of startup projects, wherein each of the eligible startup projects reach the target amount for the online fund raising;

based on the determining, transferring the one or more contributions associated with each of the eligible startup projects to the startup creator of each of the eligible startup projects;

based on the determining, transferring the mentoring associated with each of the eligible startup projects to the startup creator of each of the eligible startup projects;

distributing the eligible startup projects on a television show on a country level, wherein a plurality of television shows is performed in a plurality of countries;

receiving, by the processor, assessment of the eligible startup projects, wherein the assessment is made by the group of venture capitalists and private investors;

based on the assessment, selecting, by the processor, country winning startup projects for each of the plurality of countries;

distributing the country winning startup projects on an international television show on an international level;

receiving, by the processor, international assessment of the country winning startup projects, wherein the assessment is made by an international group of venture capitalists and private investors;

based on the international assessment, selecting, by the processor, a world winning startup project; and awarding a prize amount to the world winning startup project.

2. The computer implemented method of claim 1, wherein the startup project is associated with a product, a service, and a business.

3. The computer implemented method of claim 1, wherein the information is provided by the startup creator.

4. The computer implemented method of claim 1, wherein the one or more contributions include one or more investments, one or more votes, one or more content amendments, and one or more idea proposals.

5. The computer implemented method of claim 1, wherein the assessment is repeated monthly, quarterly, or yearly.

6. The computer implemented method of claim 1, wherein one or more further awards are periodically provided based on the assessment.

7. The computer implemented method of claim 1, wherein the assessment and the international assessment include contributions and votes of the audience, the votes being provided via SMS, online resources, and phone calls.

8. The computer implemented method of claim 1, further comprising:

based on the assessment, eliminating some of the eligible startup projects from the television show.

9. The computer implemented method of claim 1, further comprising:

based on the international assessment, eliminating some of the country winning startup projects from the television show.

10. The computer implemented method of claim 1, wherein the audience includes one or more of the following: one or more visitors of the online resource, and one or more viewers of the television show.

11. The computer implemented method of claim 1, wherein the startup creator receives crowd funding and mentoring related to development of the startup project.

12. The computer implemented method of claim 1, wherein the distributing includes broadcasting of one or more video recordings, one or more audio recording, photos, and financial reports.

13. The computer implemented method of claim 1, wherein the distributing includes broadcasting on television, radio, and online resources.

14. A system for venture capital raising for startup via award and reality television show comprising:

a processor configured to:

receive information associated with a plurality of startup projects, wherein the information includes a target amount for online fund raising, the startup project being associated with a startup creator;

pre-select, from the plurality of startup projects, a predefined number of startup projects based on predefined criteria, the predefined criteria including one or more of the following: a maximum allowed target amount for the online fund raising, minimum age of the startup creator, an execution period for the startup project;

assign mentors to the predefined number of startup projects, the mentors being selected from an international group of venture capitalists and private investors;

provide the predefined number of startup projects for the online fund raising and for mentoring via an online resource;

receive one or more contributions associated with the predefined number of startup projects from audience via the online resource;

receive, from the mentors, mentoring associated with development of the predefined number of startup projects;

determine, based on the one or more contributions, eligible startup projects among the predefined number of startup projects, wherein each of the eligible startup projects reach the target amount for the online fund raising;

based on the determination, transfer the one or more contributions associated with each of the eligible startup projects to the startup creator of each of the eligible startup projects;

based on the determination, transfer the mentoring associated with each of the eligible startup projects to the startup creator of each of the eligible startup projects;

receive advertising materials associated with the eligible startup projects, wherein the eligible startup projects are distributed on a television show on a country level, wherein a plurality of television shows is performed in a plurality of countries;

receive assessment of the eligible startup projects, wherein the assessment is made by a group of venture capitalists and private investors;

based on the assessment, select country winning startup projects for each of the plurality of countries;

receive international advertising materials associated with the country winning startup projects, wherein the country winning startup projects are distributed on an international television show on an international level;

receive international assessment of the country winning startup projects, wherein the assessment is made by the international group of venture capitalists and private investors;

based on the international assessment, select a world winning startup project; and award a prize amount to the world winning startup project;

a database in communication with the processor and configured to store the information associated with the plurality of startup projects, the target amount, the assessment and the international assessment.

15. The system of claim 14, wherein the startup project is associated with a product, a service, and a business.

16. The system of claim 14, wherein the information is provided by the startup creator, the information further including publishing, editing, sharing, or reposting messages, texts, recommendations, ideas, creations, reviews, comments, articles, photo materials, video materials, games, drawings, links, answers, payments, buying and selling records, and other activity related to the startup creator.

17. The system of claim 14, wherein the one or more contributions include one or more investments, one or more votes, one or more content amendments, and one or more idea proposals.

18. The system of claim 14, wherein the processor is further configured to:
  receive results of blind audition, wherein the group of venture capitalists and private investors reads and listens to presentations related to the eligible startup projects without seeing the presented, one or more of the venture capitalists and private investors accepting one or more of the eligible startup projects for mentoring, wherein the eligible startup projects accepted for mentoring pass to semifinal competition;
  receive startup creator choice, wherein the startup creator, whose eligible startup project is accepted by two or more venture capitalists and private investors, chooses a mentor from the two or more venture capitalists and private investors; and
  broadcast the semifinal competition, wherein the eligible startup projects accepted for mentoring make live demonstrations, the one or more contributions being provided by the audience for one of more of the eligible startup projects.

19. The system of claim 18, wherein a celebrity guest assist the mentor in mentoring the startup creator, the celebrity guest being different in each round of the TV show.

20. The system of claim 18, wherein the blind audition takes place in different cities of the countries associated with the system.

21. The system of claim 14, wherein the assessment and the international assessment includes votes of the audience, the votes being provided via SMS, online resources, phone calls, mobile applications, and social networks.

22. The system of claim 14, wherein the processor is further configured to eliminate some of the eligible startup projects from the television show based on the assessment.

23. The system of claim 14, wherein the advertising materials include a startup creator presentation associated with a startup project, the startup creator presentation being performed weekly or monthly, wherein a panel of judges criticizing the startup creator presentation.

24. The system of claim 14, wherein in a final live performance phase of the TV show, the startup creators perform in weekly shows, where investments, public voting, sales quantity, and the one or more contributions narrow to a final group of startups, one of the final group being declared the world winning startup project, wherein the prize amount is transferred to an account associated with the world winning startup project.

25. The system of claim 14, wherein one or more of the group of venture capitalists and private investors mentor one or more of the eligible startup projects, the one or more of the group of venture capitalists and private investors receiving a performance fee and carried interest related to the one or more of the eligible startup projects mentored by the one or more of the group of venture capitalists and private investors, the performance fee and carried interest being assigned after investment return.

26. The system of claim 14, wherein a startup project that is eliminated is sold to public, the sale including a direct sale, a sale via an auction, a delayed sale, and a sale with payment by installments, the sale being performed using a mobile and wearable device, wherein the mobile and wearable device is located on a human body, the human body including a wrist, an arm, a neck, a head, a leg, a waist, an ear, a finger, and any other part of the human body, wherein the mobile and wearable device is associated with one or more of a transactional payment based on Unstructured Supplementary Service Data (USSD), Short Message Service (SMS), direct operator billing, a credit card mobile payment, an online wallet, a QR code payment, contactless near field communication payment, a cloud-based mobile payment, an audio signal-based payment, a Bluetooth Low Energy (BLE) signal beacon payment, an in-application payment, an SDK payment, an API payment, a social networking payment, and a direct carrier and bank co-operation, and wherein access to the device is controlled by one or more of the following: a password, a Personal Identification Number (PIN) code, and biometric authorization, the biometric authorization including fingerprint scanning, palm scanning, face scanning, and retina scanning, wherein the scanning is performed using the one or more biometric sensors, wherein the one or more biometric sensors include sensors for measuring one or more of the following: a blood pressure, a pulse, a heart rate, a glucose level, a body temperature, an environment temperature, and arterial properties, the measuring shown on the display, the device further comprising a fingerprint reader configured to scan a fingerprint, the scanned fingerprint being matched to one or more approved fingerprints, wherein access to the wearable personal digital is granted based on the matching.

27. The system of claim 14, wherein the advertising materials include one or more video recordings, one or more audio recording, photos, and financial reports, the one or more video recordings including audition episodes performed by the group of venture capitalists and private investors.

28. A non-transitory computer-readable medium comprising instructions, which when executed by one or more processors, perform the following operations:
  receive information associated with a plurality of startup projects, wherein the information includes a target amount for online fund raising, the startup project being associated with a startup creator;
  pre-select, from the plurality of startup projects, a predefined number of startup projects based on predefined criteria, the predefined criteria including one or more of the following: a maximum allowed target amount for the online fund raising, minimum age of the startup creator, an execution period for the startup project;
  assign mentors to the predefined number of startup projects, the mentors being selected from a group of venture capitalists and private investors;
  provide the predefined number of startup projects for the online fund raising and for mentoring via an online resource;
  receive one or more contributions associated with the predefined number of startup projects from audience via the online resource;
  receive, from the mentors, mentoring associated with development of the predefined number of startup projects;
  determine, based on the one or more contributions, eligible startup projects among the predefined number of startup projects, wherein each of the eligible startup projects reach the target amount for the online fund raising;
  based on the determination, transfer the one or more contributions associated with each of the eligible startup projects to the startup creator of each of the eligible startup projects;
  based on the determination, transfer the mentoring associated with each of the eligible startup projects to the startup creator of each of the eligible startup projects;
  receive advertising materials associated with the eligible startup projects, wherein the eligible startup projects are distributed on a television show on a country level, wherein a plurality of television shows is performed in a plurality of countries;
receive assessment of the eligible startup projects, wherein the assessment is made by the group of venture capitalists and private investors;
based on the assessment, select country winning startup projects for each of the plurality of countries;
receive international advertising materials associated with the country winning startup projects, wherein the country winning startup projects are distributed on an international television show on an international level;
receive international assessment of the country winning startup projects, wherein the assessment is made by an international group of venture capitalists and private investors;
based on the international assessment, select a world winning startup project; and
award a prize amount to the world winning startup project.

* * * * *